US007857883B2

(12) United States Patent
Scheckel et al.

(10) Patent No.: US 7,857,883 B2
(45) Date of Patent: Dec. 28, 2010

(54) INERTIAL GAS-LIQUID SEPARATOR WITH CONSTRICTABLE AND EXPANSIBLE NOZZLE VALVE SIDEWALL

(75) Inventors: Benjamin L. Scheckel, Stoughton, WI (US); Thomas J. Braun, Stoughton, WI (US); Bradley A. Smith, Madison, WI (US); Peter K. Herman, Stoughton, WI (US); Matthew T. VandenBush, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 662 days.

(21) Appl. No.: 11/873,483

(22) Filed: Oct. 17, 2007

(65) Prior Publication Data

US 2009/0100811 A1 Apr. 23, 2009

(51) Int. Cl.
*B01D 45/08* (2006.01)

(52) U.S. Cl. ............................ 55/468; 55/445; 55/446; 55/DIG. 14; 55/DIG. 19

(58) Field of Classification Search .................. 55/309, 55/320, 329, 332, 416, 418–42, 462, 465, 55/468, DIG. 14, DIG. 19, 467, 445, 446; 95/268

See application file for complete search history.

(56) References Cited

U.S. PATENT DOCUMENTS

| | | | | |
|---|---|---|---|---|
| 1,548,288 | A | 8/1925 | Smith | |
| 2,505,757 | A * | 5/1950 | Dunbar et al. | 137/512.1 |
| 2,729,939 | A * | 1/1956 | Campbell | 60/39.77 |
| 3,083,874 | A * | 4/1963 | Richards | 222/67 |
| 3,201,925 | A | 8/1965 | Shada | |
| 3,286,728 | A * | 11/1966 | Stephenson | 137/856 |
| 3,412,754 | A * | 11/1968 | Schou et al. | 137/512.1 |
| 3,433,231 | A | 3/1969 | Siragusa | |
| 3,690,304 | A * | 9/1972 | Schneider et al. | 123/73 V |
| 3,741,234 | A * | 6/1973 | Siebold | 137/202 |
| 3,905,340 | A * | 9/1975 | Boyesen | 123/73 A |
| 3,923,480 | A | 12/1975 | Visch | |
| 3,981,276 | A * | 9/1976 | Ernest | 123/242 |
| 4,012,209 | A | 3/1977 | McDowell et al. | |
| 4,014,673 | A | 3/1977 | Kinnison | |
| 4,051,820 | A * | 10/1977 | Boyesen | 123/73 A |
| 4,401,093 | A | 8/1983 | Gates, Jr. et al. | |
| 4,524,805 | A | 6/1985 | Hoffman | |
| 4,552,288 | A * | 11/1985 | Flider | 222/482 |
| 4,580,701 | A | 4/1986 | Tamaki | |

(Continued)

FOREIGN PATENT DOCUMENTS

| | | |
|---|---|---|
| CH | 127029 | 5/1927 |

(Continued)

OTHER PUBLICATIONS

High Efficient Oil Separation Systems for Minimised Oil Carry Over, MTZ Apr. 2008 vol. 69, pp. 32-37.

*Primary Examiner*—Duane Smith
*Assistant Examiner*—Sonji Turner
(74) *Attorney, Agent, or Firm*—Andrus, Sceales, Starke & Sawall, LLP; J. Bruce Schelkopf

(57) ABSTRACT

An inertial gas-liquid separator has one or more nozzle valves having a sidewall and a downstream exit axial end radially constrictable and expansible to vary axial flow of a gas-liquid stream therethrough to an inertial impactor collector.

2 Claims, 18 Drawing Sheets

U.S. PATENT DOCUMENTS

| | | | | | |
|---|---|---|---|---|---|
| 4,643,139 | A | * | 2/1987 | Hargreaves | 123/65 V |
| 4,690,107 | A | * | 9/1987 | Emler et al. | 123/65 V |
| 4,748,944 | A | * | 6/1988 | Iida et al. | 123/73 V |
| 4,836,151 | A | * | 6/1989 | Litjens et al. | 123/65 V |
| 4,879,976 | A | * | 11/1989 | Boyesen | 123/65 V |
| 4,993,517 | A | | 2/1991 | Leipelt et al. | |
| 5,036,806 | A | * | 8/1991 | Rarick | 123/65 V |
| 5,129,371 | A | | 7/1992 | Rosalik, Jr. | |
| 5,176,170 | A | * | 1/1993 | Boyesen | 137/512.1 |
| 5,205,243 | A | * | 4/1993 | Buchholz | 123/41.86 |
| 5,243,934 | A | * | 9/1993 | Boyesen | 123/73 V |
| 5,245,956 | A | * | 9/1993 | Martin | 123/73 V |
| 5,247,912 | A | * | 9/1993 | Boyesen et al. | 123/65 V |
| 5,253,617 | A | * | 10/1993 | Fitzpatrick et al. | 123/184.54 |
| 5,373,867 | A | * | 12/1994 | Boyesen et al. | 137/514 |
| 5,460,147 | A | | 10/1995 | Bohl | |
| 5,562,087 | A | | 10/1996 | Wright | |
| 5,564,401 | A | | 10/1996 | Dickson | |
| 5,794,654 | A | * | 8/1998 | Marvonek et al. | 137/512.15 |
| 6,073,618 | A | | 6/2000 | Sanders et al. | |
| 6,074,448 | A | | 6/2000 | Schulz et al. | |
| 6,247,463 | B1 | | 6/2001 | Fedorowicz et al. | |
| 6,279,556 | B1 | | 8/2001 | Busen et al. | |
| 6,290,738 | B1 | | 9/2001 | Holm | |
| 6,293,268 | B1 | | 9/2001 | Mammarella | |
| 6,354,283 | B1 | | 3/2002 | Hawkins et al. | |
| 6,402,798 | B1 | | 6/2002 | Kallsen et al. | |
| 6,418,918 | B2 | | 7/2002 | Mammarella | |
| 6,478,018 | B2 | | 11/2002 | Fedorowicz et al. | |
| 6,478,019 | B2 | | 11/2002 | Fedorowicz et al. | |
| 6,505,615 | B2 | | 1/2003 | Pietschner | |
| 6,533,712 | B1 | | 3/2003 | Miller et al. | |
| 6,568,540 | B1 | | 5/2003 | Holzmann et al. | |
| 6,576,045 | B2 | | 6/2003 | Liu et al. | |
| 6,601,385 | B2 | | 8/2003 | Verdegan et al. | |
| 6,626,163 | B1 | | 9/2003 | Busen et al. | |
| 6,684,864 | B1 | | 2/2004 | Busen et al. | |
| 6,797,040 | B2 | | 9/2004 | Lenzig | |
| 6,880,577 | B2 | * | 4/2005 | Tassinari et al. | 137/855 |
| 6,973,925 | B2 | | 12/2005 | Sauter et al. | |
| 6,986,472 | B2 | | 1/2006 | Gordon | |
| 7,080,636 | B2 | | 7/2006 | Knaus et al. | |
| 7,152,589 | B2 | | 12/2006 | Ekeroth et al. | |
| 7,156,901 | B2 | | 1/2007 | Hallgren et al. | |
| 7,238,216 | B2 | | 7/2007 | Malgorn | |
| 2003/0140968 | A1 | * | 7/2003 | Chang | 137/521 |
| 2005/0000572 | A1 | | 1/2005 | Muller | |
| 2006/0059875 | A1 | | 3/2006 | Malgorn et al. | |
| 2006/0062699 | A1 | | 3/2006 | Evenstad et al. | |
| 2006/0081229 | A1 | | 4/2006 | Gronberg | |
| 2006/0249128 | A1 | | 11/2006 | Shieh et al. | |
| 2007/0062887 | A1 | | 3/2007 | Schwandt et al. | |
| 2007/0178322 | A1 | * | 8/2007 | Chun et al. | 428/469 |
| 2007/0256566 | A1 | | 11/2007 | Faber et al. | |

FOREIGN PATENT DOCUMENTS

| | | | | |
|---|---|---|---|---|
| DE | 1544126 | | | 6/1969 |
| DE | 10051307 | | | 5/2002 |
| DE | 10320215 | | | 12/2004 |
| DE | 102005042286 | | | 4/2007 |
| EP | 0754840 | | | 1/1997 |
| EP | 1068890 | | | 1/2001 |
| EP | 1477641 | | | 11/2004 |
| FR | 1406047 | | | 7/1965 |
| FR | 2835764 | | | 8/2003 |
| FR | 2852056 | | | 9/2004 |
| JP | 63167024 | A | * | 7/1988 |
| JP | 06147042 | A | * | 5/1994 |
| JP | 09242551 | A | * | 9/1997 |
| WO | WO-2006/119737 | | | 11/2006 |
| WO | WO-2007/028351 | | | 3/2007 |
| WO | WO-2007/137934 | | | 12/2007 |
| WO | WO-2007/138008 | | | 12/2007 |

* cited by examiner

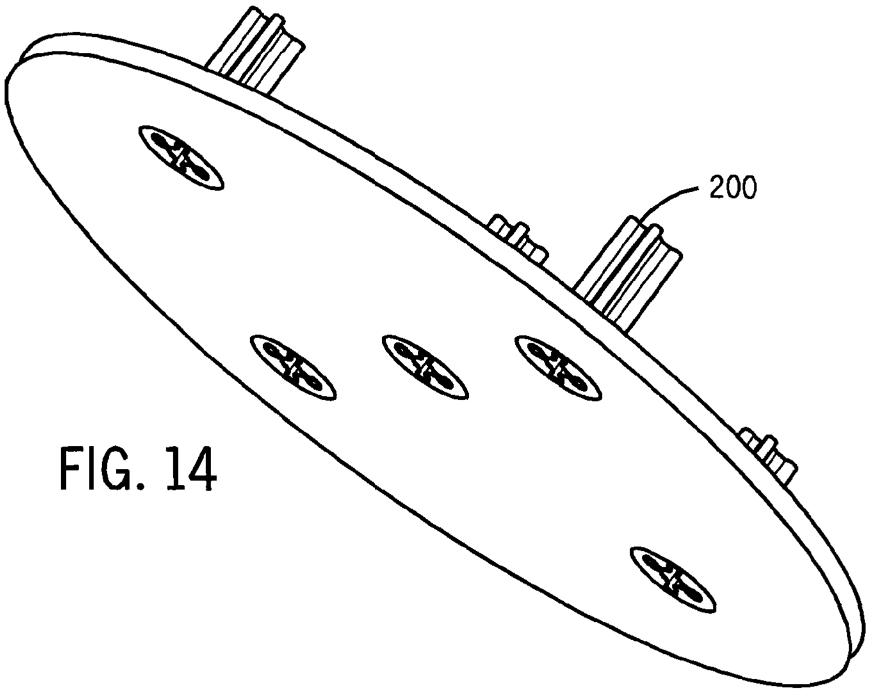
FIG. 14
FIG. 15
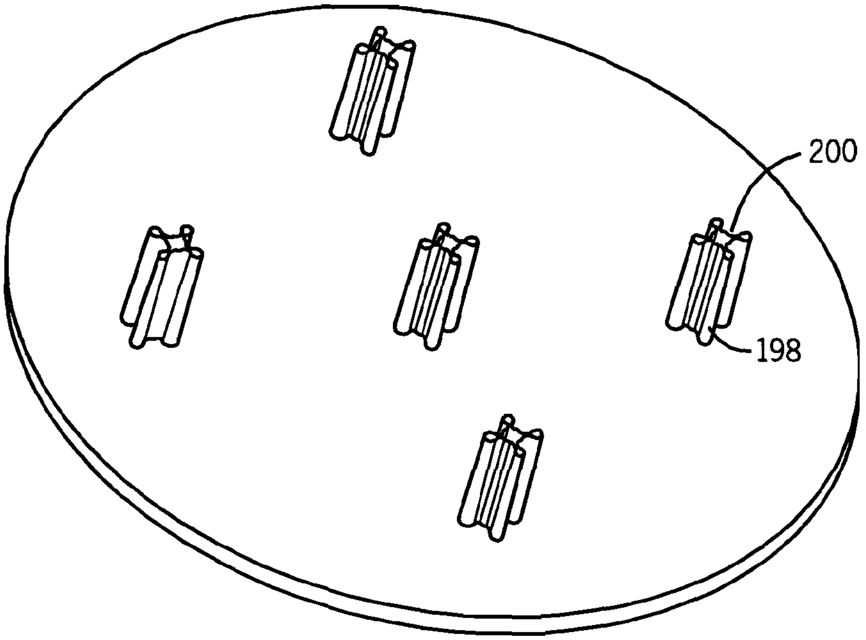

INERTIAL GAS-LIQUID SEPARATOR WITH CONSTRICTABLE AND EXPANSIBLE NOZZLE VALVE SIDEWALL

BACKGROUND AND SUMMARY

The invention relates to inertial gas-liquid impactor separators for removing liquid particles from a gas-liquid stream, including in engine crankcase ventilation separation applications, including closed crankcase ventilation (CCV) and open crankcase ventilation (OCV) systems.

Inertial gas-liquid separators are known in the prior art, for example U.S. Pat. No. 6,290,738, incorporated herein by reference. Liquid particles are removed from a gas-liquid stream by accelerating the stream or aerosol to high velocities through nozzles or orifices and directing same against an impactor, typically causing a sharp directional change, effecting the noted liquid separation. Such inertial impactors have various uses, including in oil separation applications for blowby gas from the crankcase of an internal combustion engine.

The present invention arose during continuing development efforts in the above technology, and provides the improvements in nozzle valves directing the gas-liquid stream against the impactor.

BRIEF DESCRIPTION OF THE DRAWINGS

Prior Art

FIG. 1 is a schematic side sectional view of an inertial gas-liquid separator in an engine crankcase ventilation separation application.

FIG. 2 is like FIG. 1 and shows another embodiment.

FIG. 3 is like FIG. 1 and shows another embodiment.

FIG. 4 is like FIG. 1 and shows another embodiment.

FIG. 5 is like FIG. 1 and shows another embodiment.

FIG. 6 shows a further embodiment.

Present Application

Figure 6:
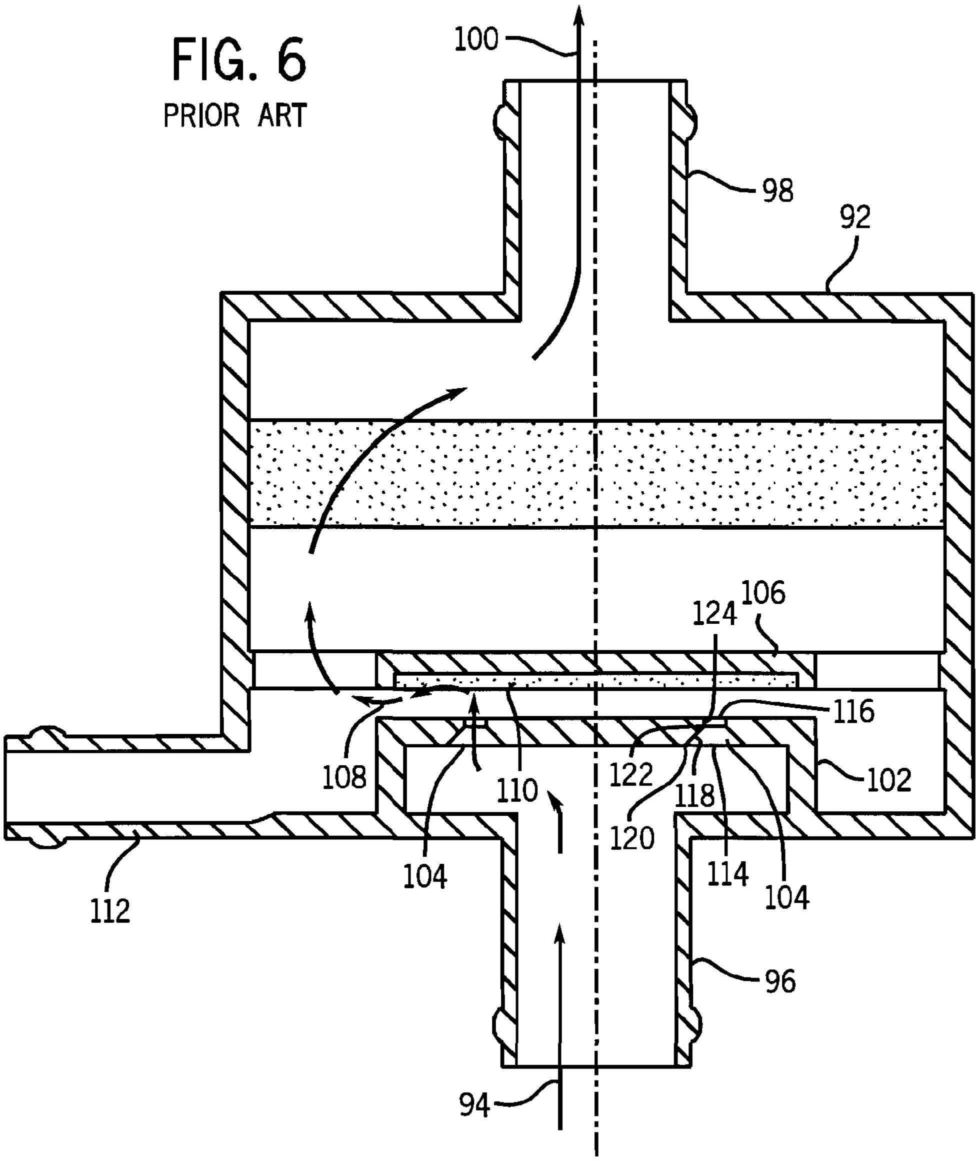
Figure 7:
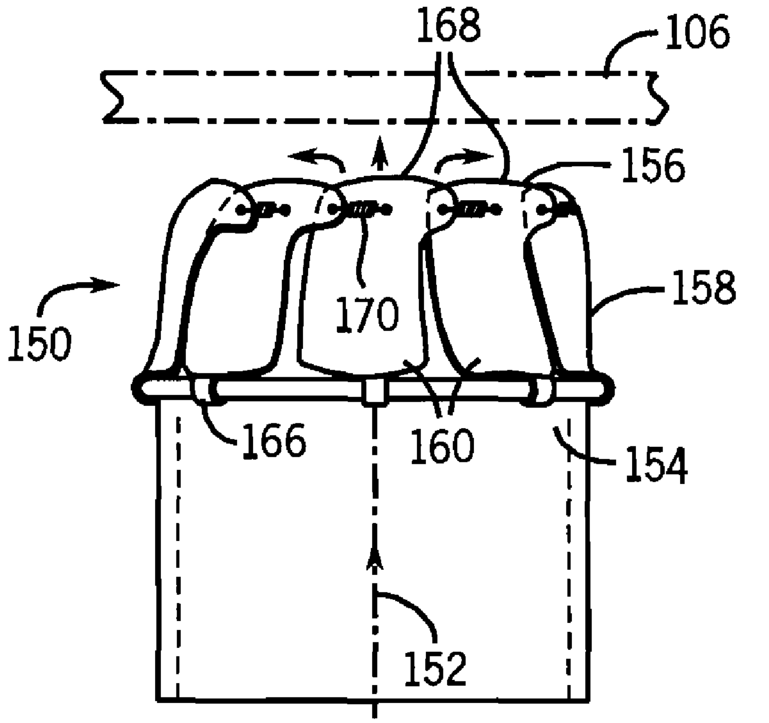

FIG. 7 is a perspective view of a nozzle valve for use in the inertial gas-liquid impactor separator of FIG. 6.

Figure 8:
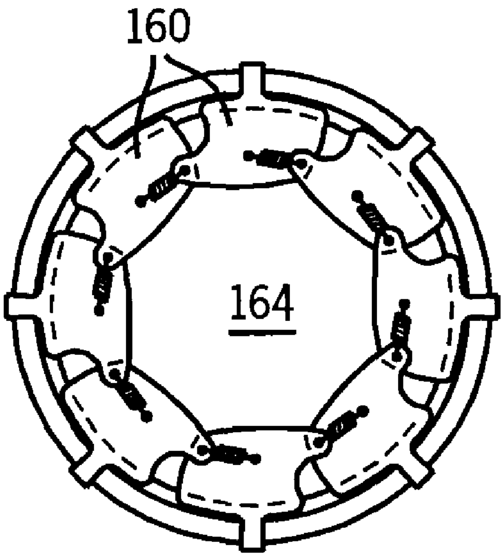

FIG. 8 is a top view of the structure of FIG. 7.

Figure 9:
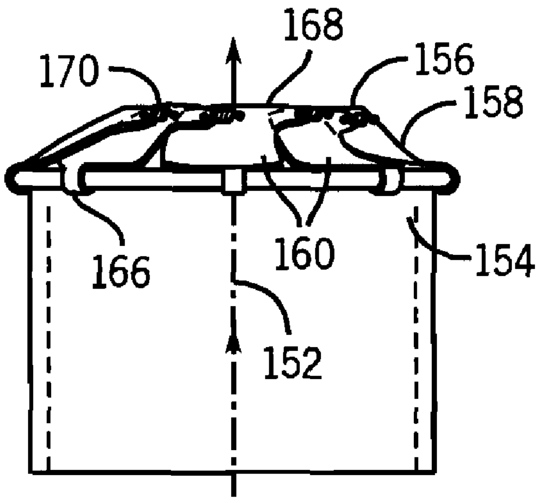

FIG. 9 is like FIG. 7 and shows a further functional condition thereof.

Figure 10:
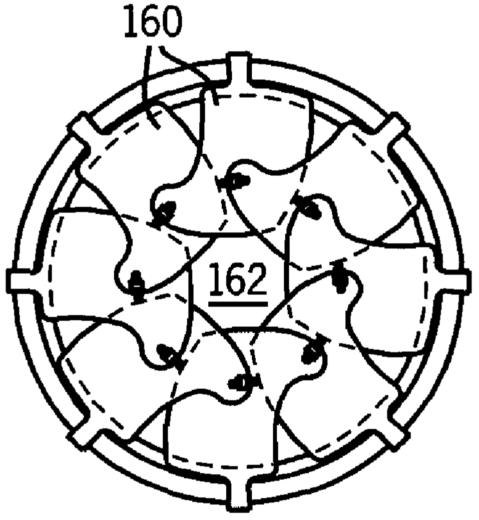

FIG. 10 is a top view of the structure of FIG. 9.

Figure 11:
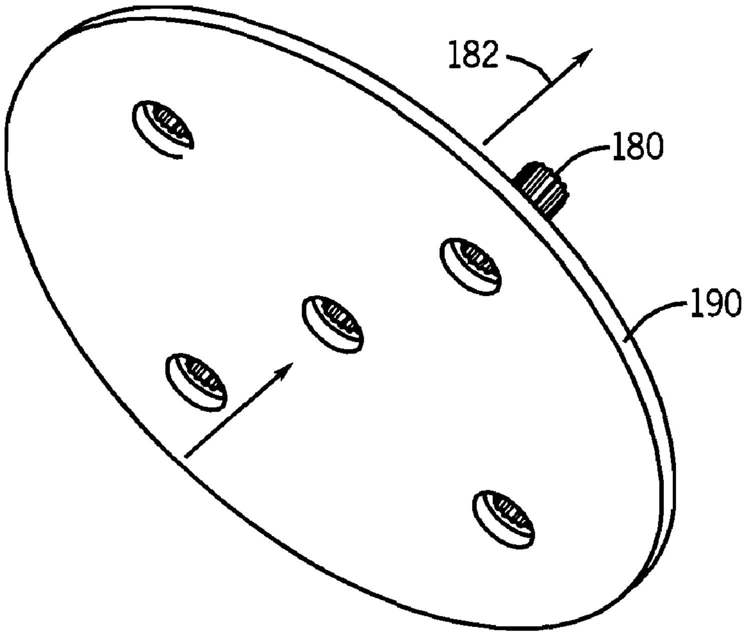

FIG. 11 is a perspective view of a further nozzle valve for use in the inertial gas-liquid impactor separator of FIG. 6.

Figure 12:
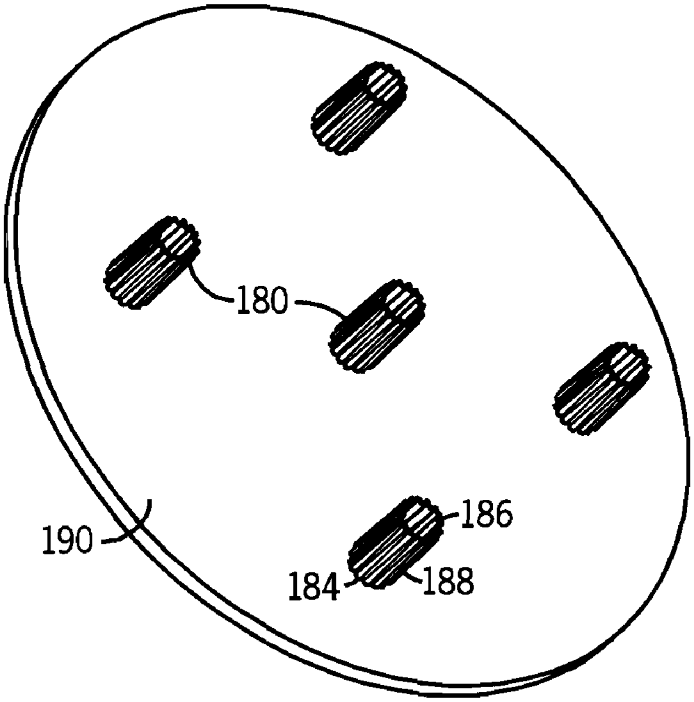

FIG. 12 is a perspective view of the structure of FIG. 11 from a different angle.

Figure 13:
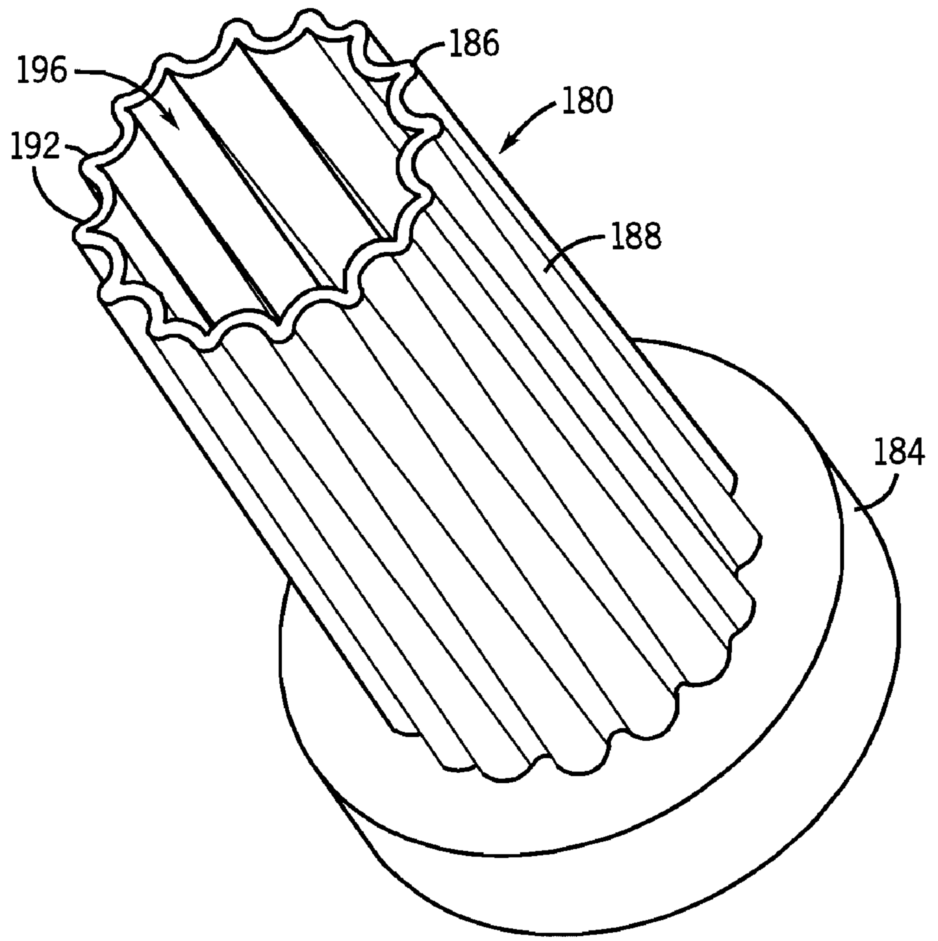

FIG. 13 is an enlarged view of a portion of FIG. 12.

FIG. 14 is like FIG. 11 and shows another embodiment.

FIG. 15 is a perspective view of the structure of FIG. 14 from a different angle.

Figure 16:
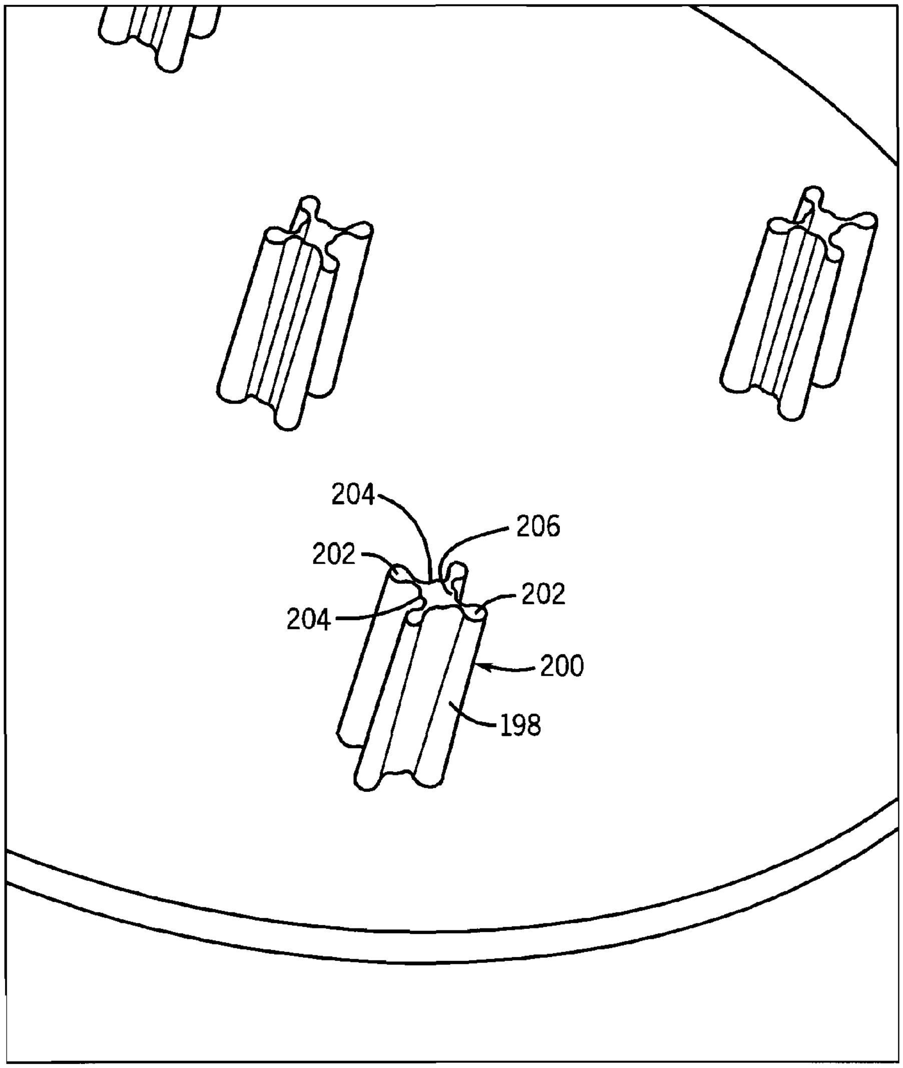

FIG. 16 is an enlarged view of a portion of FIG. 15.

Figure 17:
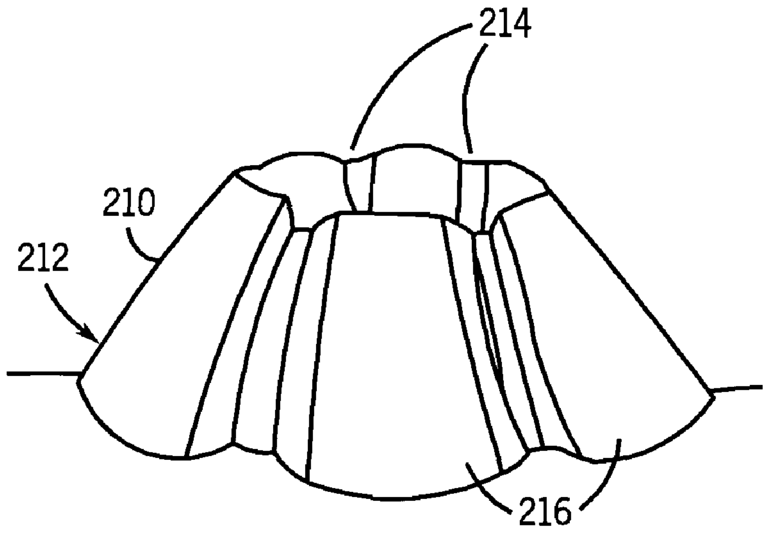

FIG. 17 is a perspective view of a further nozzle valve for use in the inertial gas-liquid impactor separator of FIG. 6.

Figure 18:
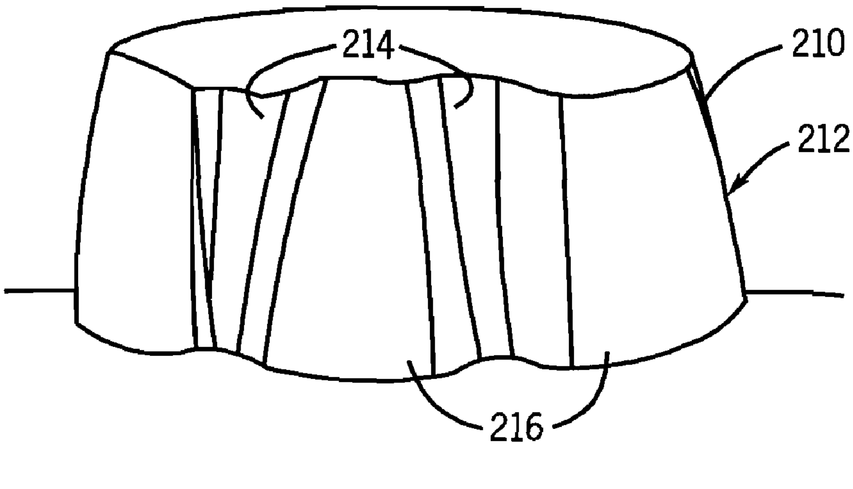

FIG. 18 is like FIG. 17 and shows a further functional condition thereof.

Figure 19:
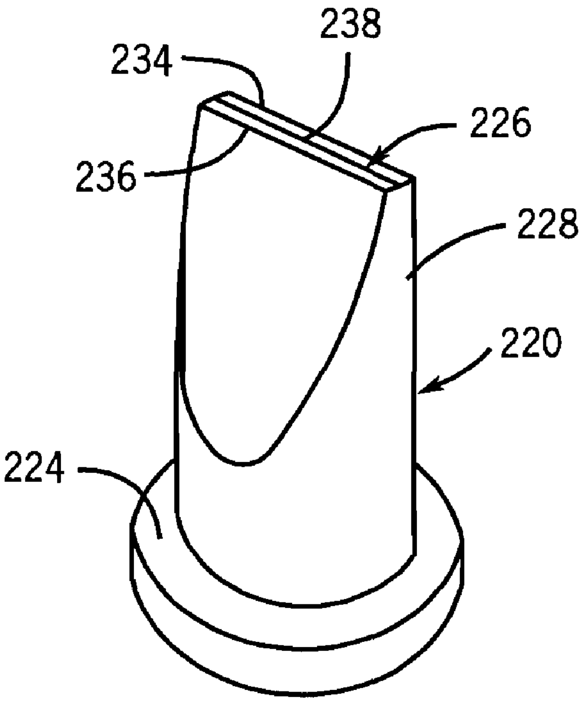

FIG. 19 is a perspective view of a further nozzle valve for use in the inertial gas-liquid impactor separator of FIG. 6.

Figure 20:
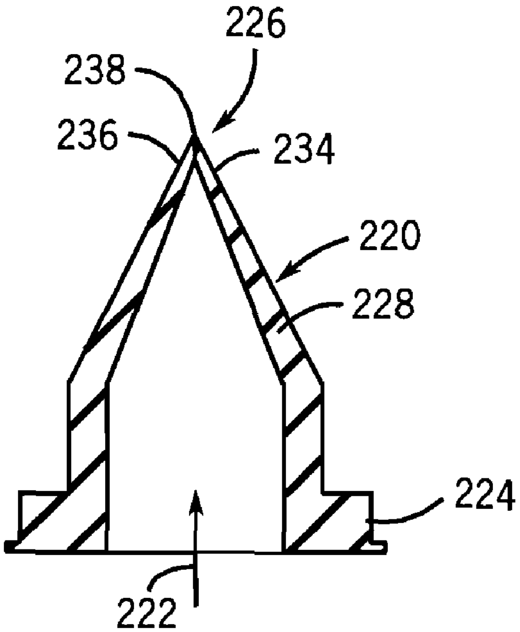

FIG. 20 is a sectional view of the structure of FIG. 19.

Figure 21:
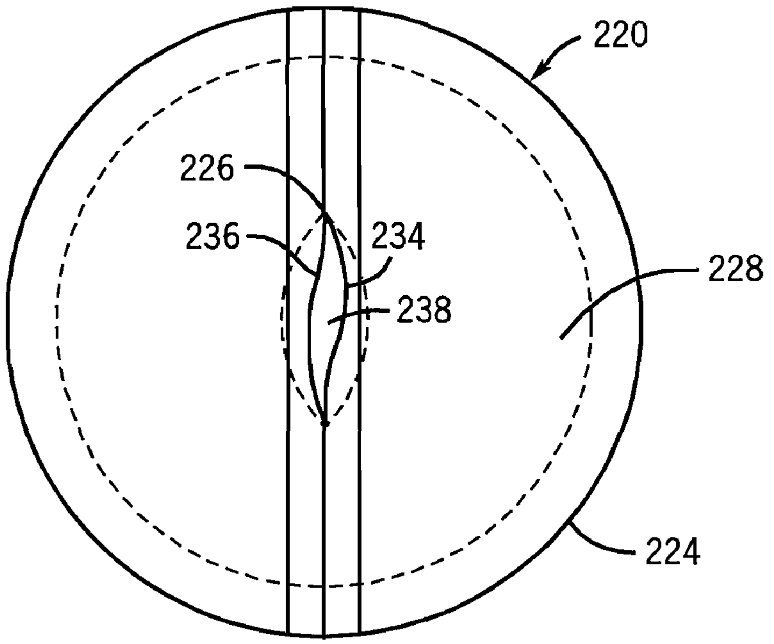

FIG. 21 is a top view of the structure of FIG. 20.

Figure 22:
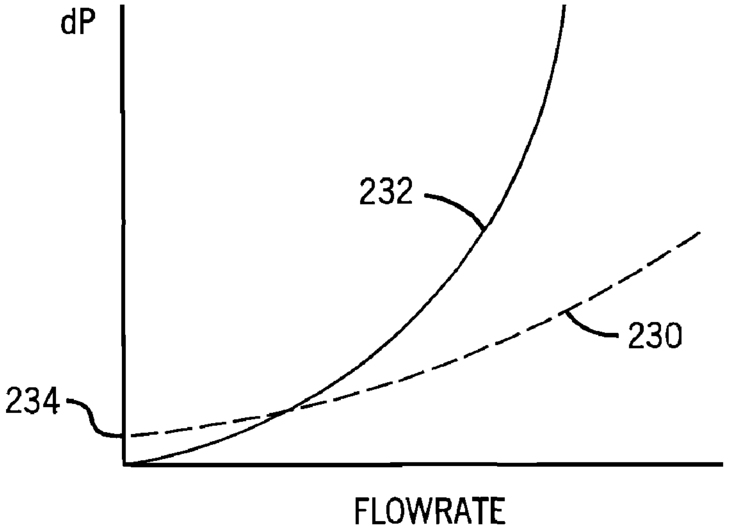

FIG. 22 is a graph illustrating functional operation of the nozzle valve of FIGS. 19-21.

Figure 23:
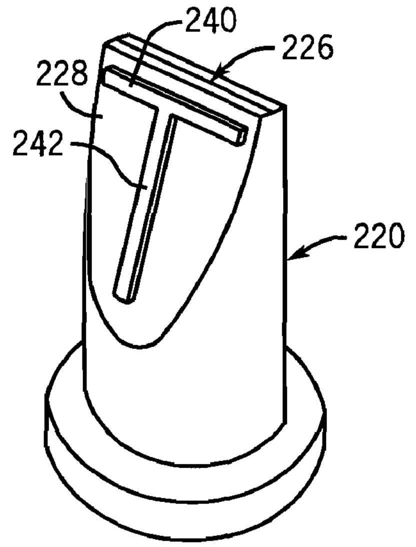

FIG. 23 is like FIG. 19 and shows a further embodiment.

Figure 24:
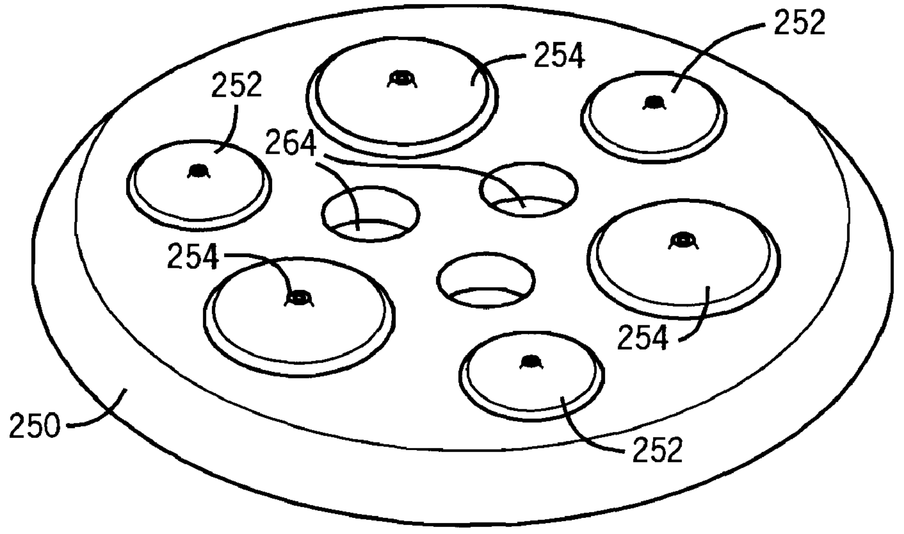

FIG. 24 is a perspective view of further nozzle valve structure for use in the inertial gas-liquid impactor separator of FIG. 6.

Figure 25:
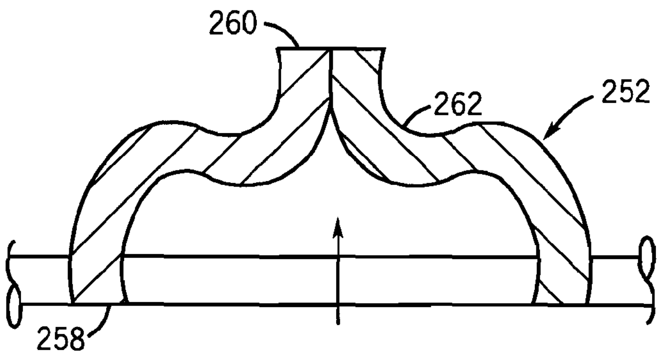

FIG. 25 is a sectional view of a portion of FIG. 24.

Figure 26:
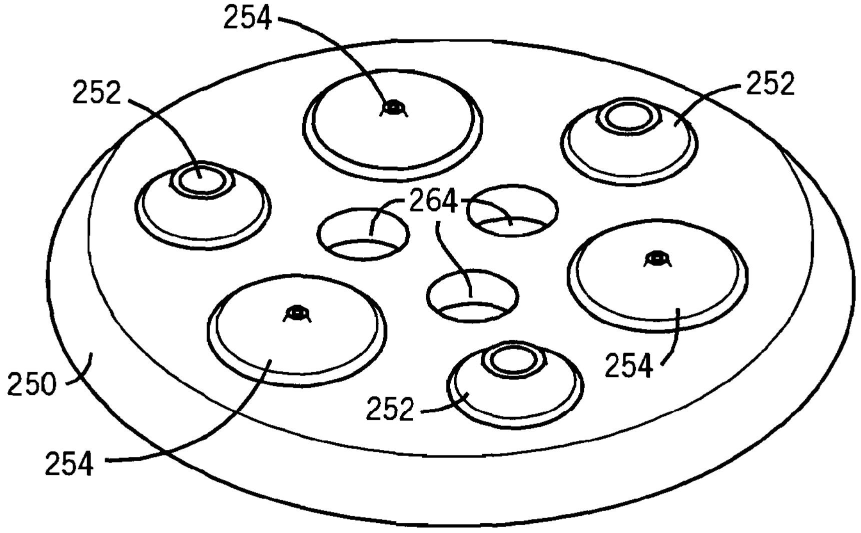

FIG. 26 is like FIG. 24 and shows a further functional condition thereof.

Figure 27:
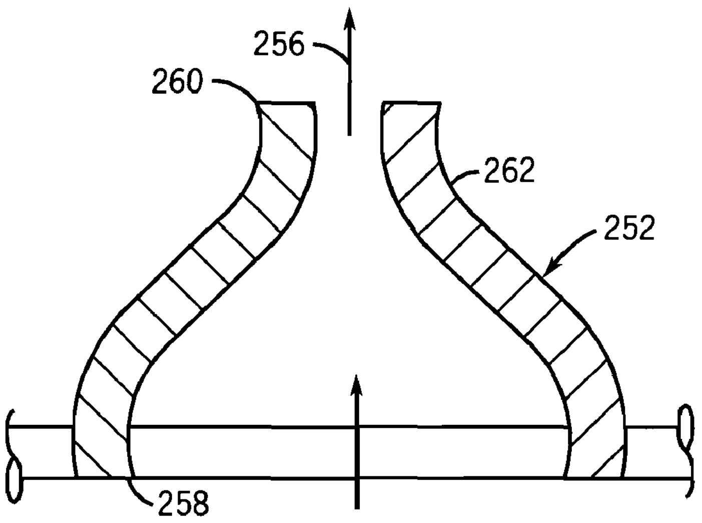

FIG. 27 is a sectional view of a portion of FIG. 26.

Figure 28:
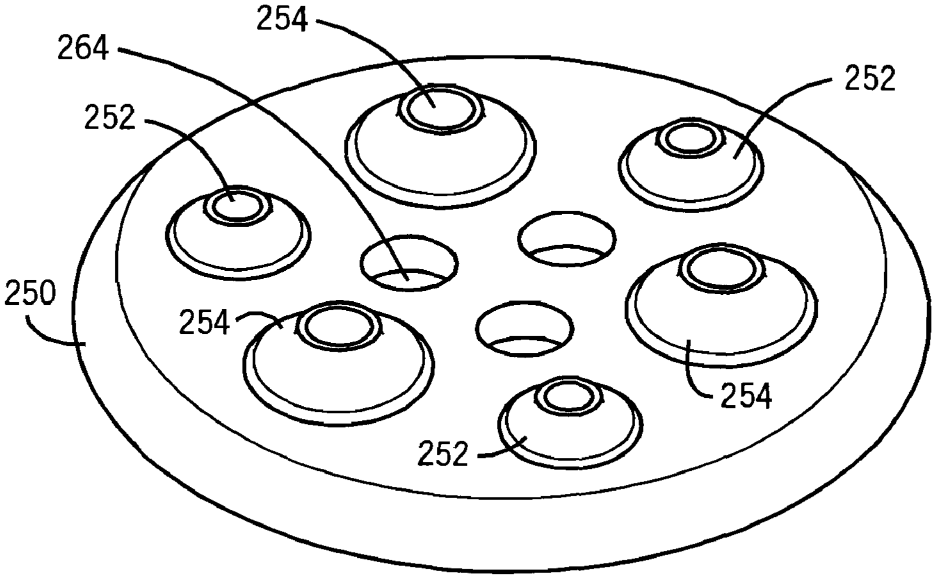

FIG. 28 is like FIG. 26 and shows a further functional condition thereof.

Figure 29:
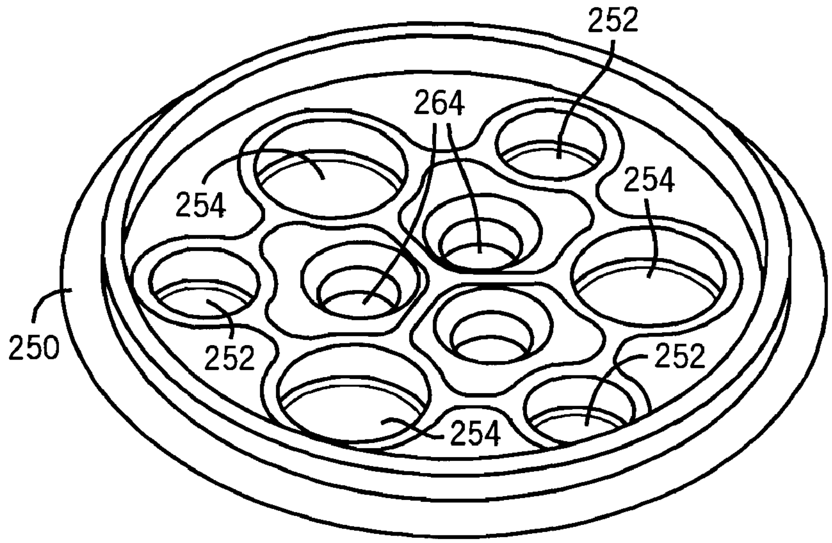

FIG. 29 is a perspective view from below of the structure of FIG. 24.

Figure 30:
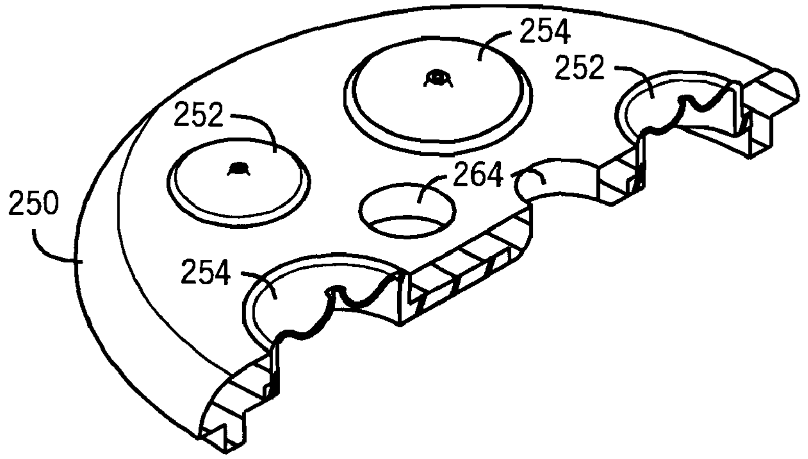

FIG. 30 is like FIG. 24 but partially cut away.

Figure 31:
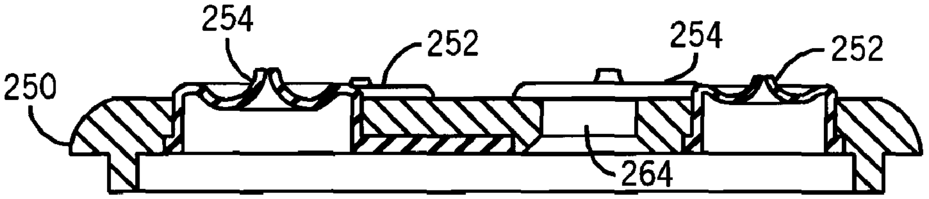

FIG. 31 is a sectional view of the structure of FIG. 24 along the section of FIG. 30.

Figure 32:
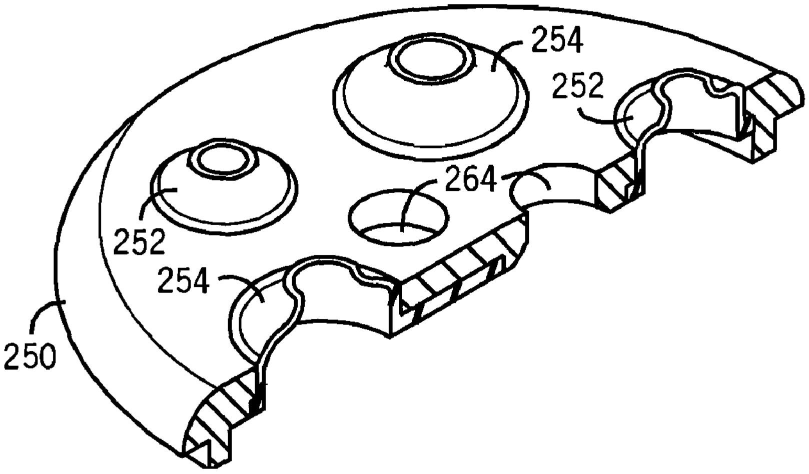

FIG. 32 is like FIG. 28 but partially cut away.

Figure 33:
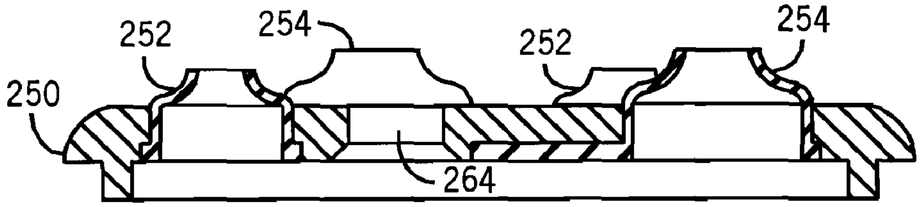

FIG. 33 is a sectional view of the structure of FIG. 28 along the section of FIG. 32.

DETAILED DESCRIPTION

Prior Art

The following description of FIGS. 1-6 is taken from incorporated U.S. Pat. No. 6,290,738.

Figure 1:
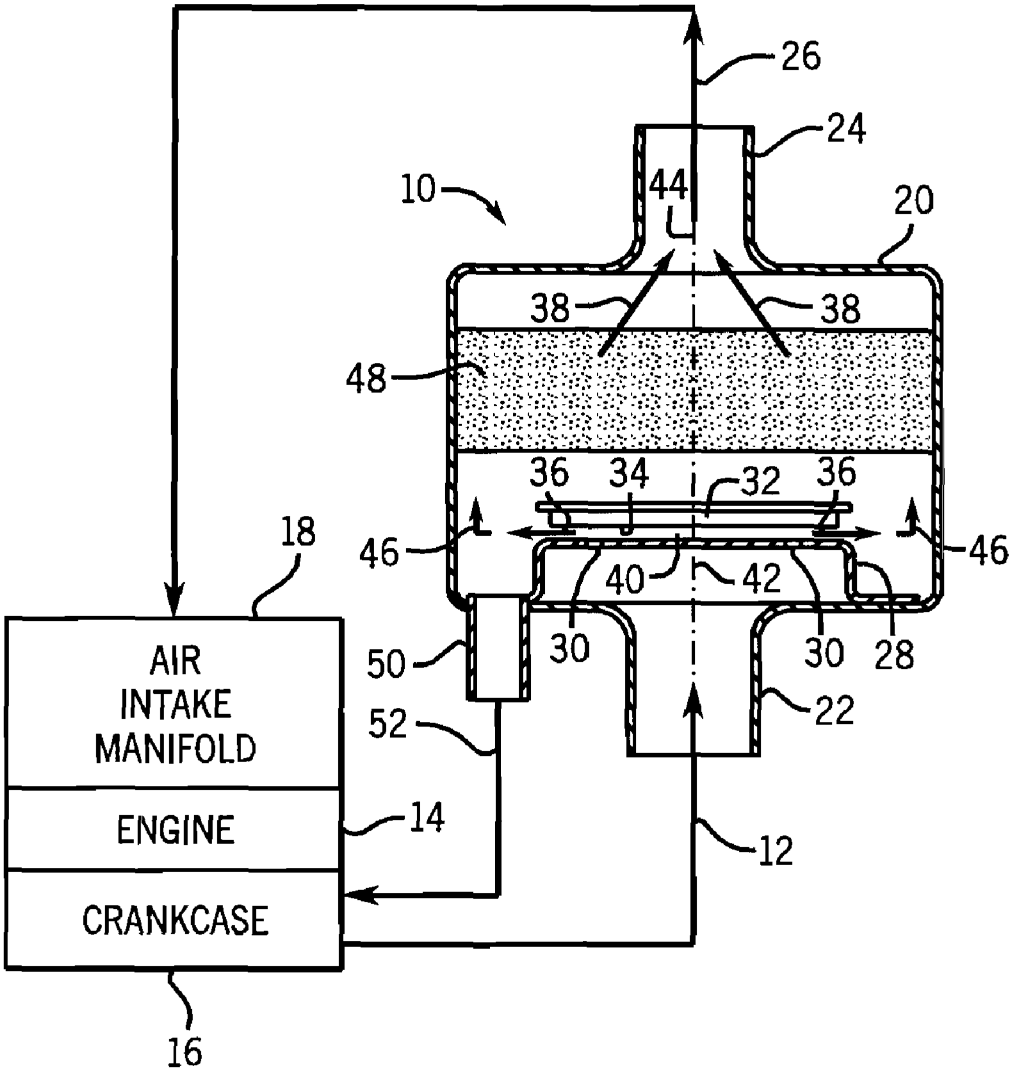
FIGS. 1-6 are taken from incorporated U.S. Pat. No. 6,290,738.

FIG. 1 shows an inertial gas-liquid separator 10 for removing and coalescing liquid particles from a gas-liquid stream 12, and shown in an exemplary crankcase ventilation separation application for an internal combustion engine 14. In such application, it is desired to vent combustion blow-by gases from crankcase 16 of engine 14. Untreated, these gases contain particulate matter in the form of oil mist and soot. It is desirable to control the concentration of the contaminants, especially if the blow-by gases are to be recirculated back into the engine's air intake system, for example at air intake manifold 18. The oil mist droplets are generally less than 5 microns in diameter, and hence are difficult to remove using conventional fibrous filter media while at the same time maintaining low flow resistance as the media collects and becomes saturated with oil and contaminants.

Separator 10 includes a housing 20 having an inlet 22 for receiving gas-liquid stream 12 from engine crankcase 16, and an outlet 24 for discharging a gas stream 26 to air intake manifold 18. Nozzle structure 28 in the housing has a plurality of nozzles or holes 30 receiving the gas-liquid stream from inlet 22 and accelerating the gas-liquid stream through nozzles 30. An inertial collector 32 in the housing is in the path of the accelerated gas-liquid stream and causes a sharp directional change thereof as shown at 36. Collector 32 has a rough porous collection or impingement surface 34 causing liquid particle separation from the gas-liquid stream of smaller size liquid particles than a smooth non-porous impactor impingement surface and without the sharp cut-off size of the latter. The use of a rough porous collection surface is contrary to typical inertial gas-liquid separators, but is intentional in the present system, for the above noted reasons, and as further noted herein.

The noted rough porous collection surface improves overall separation efficiency including for liquid particles smaller than the cut-off size of a smooth non-porous impactor impingement surface. The rough porous collection surface causes both: a) liquid particle separation from the gas-liquid stream; and b) collection of the liquid particles within the collection surface. The rough porous collection surface has a cut-off size for particle separation which is not as sharp as that of a smooth non-porous impactor impingement surface but improves collection efficiency for particles smaller than the cut-off size as well as a reduction in cut-off size. The rough porous collection surface provides a coalescing medium, such that liquid particles, once captured within the collection surface, will coalesce with other liquid particles in the collection surface, and such that the accelerated gas stream and resultant high velocity of gas at and within the collection surface creates drag forces sufficient to cause captured liquid to migrate to outer edges of the collection surface and shed off of the collector. After the noted sharp directional change, outlet 24 receives the gas stream, as shown at 38, absent the separated liquid particles. Collection surface 34 and nozzles 30 are separated by a gap 40 sufficient to avoid excessive restriction. Housing 20 has a flow path therethrough including a first flow path portion 42 for the gas-liquid stream between inlet 22 and gap 40, and a second flow path portion 44 for the gas stream between gap 40 and outlet 24. The flow path through housing 20 has a directional change in gap 40 at collection surface 34, and another directional change in the noted second flow path portion, as shown at 46.

A pass-through filter 48, FIG. 1, in the noted second flow path portion provides a back-up safety filter trapping liquid particles re-entrained in the gas stream after separation at inertial collector 32. Drain 50 in the housing drains separated fluid from the collector. In FIG. 1, drain 50 drains the separated fluid externally of housing 20 as shown at 52 back to crankcase 16. Drain 50 is gravitationally below and on the opposite side of collector 32 from pass-through filter 48. In FIG. 1, gas stream 26 flows along a vertical axial direction. Filter 48 extends along a radial left-right horizontal span perpendicular to the noted axial vertical direction. The noted radial horizontal span of pass-through filter 48 extends across the entire housing and is parallel to collection surface 34. The gas stream flows radially at 36 along and parallel to collection surface 34 after separation and then turns 90° as shown at 46 and flows through pass-through filter 48 to outlet 24 as shown at 38.

Figure 2:
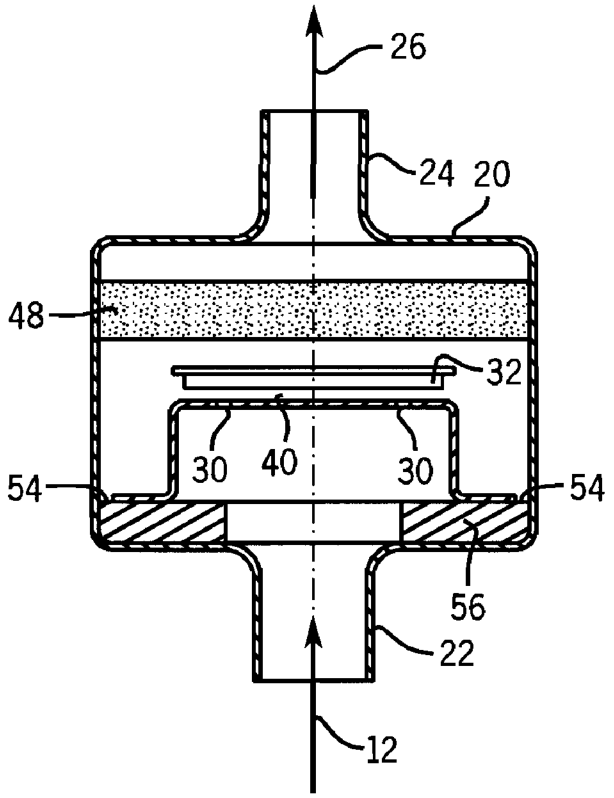

FIG. 2 is similar to FIG. 1 and uses like reference numerals where appropriate to facilitate understanding. In FIG. 2, drain 54 drains separated fluid back to inlet 22. A second pass-through filter 56 in the housing is gravitationally below and on the opposite side of collector 32 from pass-through filter 48 and filters separated liquid from collector 32. Drain 54 drains filtered fluid through pass-through filter 56 to inlet 22.

Drain 54 in FIG. 2 is also a bypass port through which gas-liquid stream 12 may flow to gap 40 without being accelerated through nozzles 30. The gas-liquid stream from inlet 22 thus has a main flow path through nozzles 30 and accelerated through gap 40 against collector 32, and an alternate flow path through filter 56 and bypass port 54 to gap 40. Pass-through filter 56 in the noted alternate flow path traps and coalesces liquid in the gas-liquid stream from inlet 22 to remove liquid from the gas stream supplied to outlet 24 through the noted alternate flow path. Outlet 24 thus receives a gas stream from the noted main flow path with liquid removed by collector 32, and also receives a gas stream from the noted alternate flow path with liquid removed by pass-through filter 56. Inlet 22 is gravitationally below pass-through filter 56. Liquid removed by pass-through filter 56 from the gas-liquid stream in the noted alternate flow path thus drains to inlet 22. Pass-through filter 56 also filters liquid removed from the gas-liquid stream in the noted main flow path by collector 32 and drains such liquid through drain 54 and filter 56 back to inlet 22.

Figure 3:
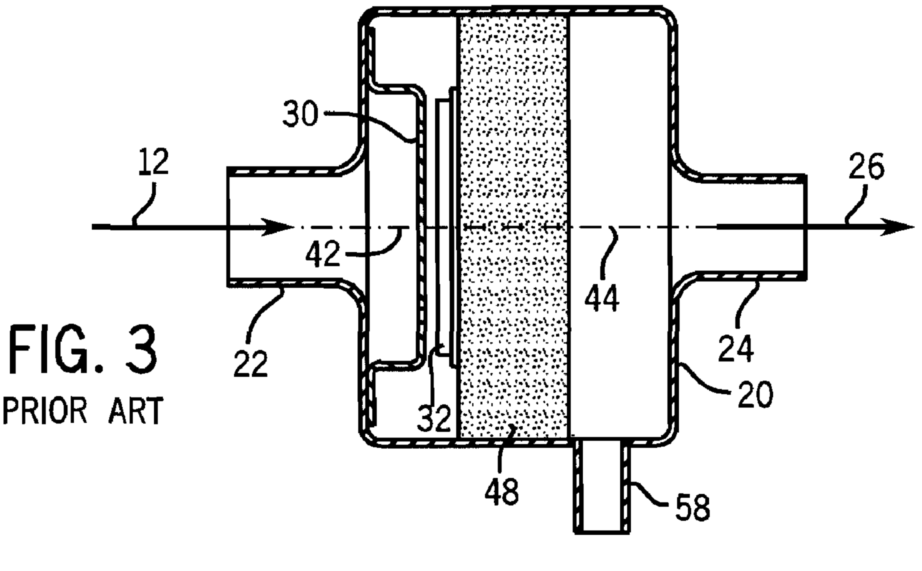

FIG. 3 uses like reference numerals from above where appropriate to facilitate understanding. In FIG. 3, the axial flow of the gas stream through the housing is horizontal. Drain 58 in the housing drains separated fluid from the collector externally of the housing back to crankcase 16. Drain 58 is in the noted second flow path portion 44 and drains separated fluid from collector 32 through pass-through filter 48 such that the latter filters both gas stream 26 and the separated fluid. Drain 58 is between pass-through filter 48 and outlet 24, and is gravitationally below collector 32 and outlet 24 and pass-through filter 48.

Figure 4:
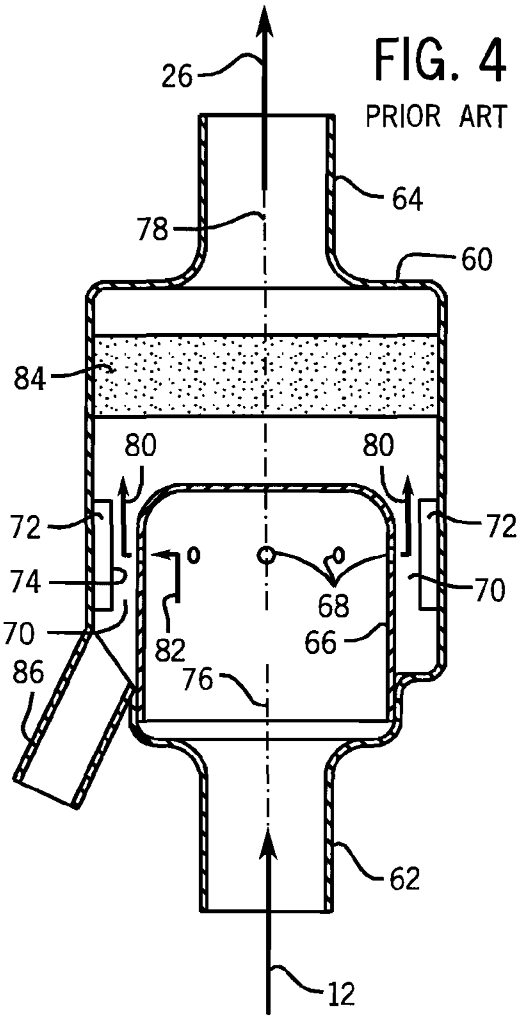

FIG. 4 uses like reference numbers from above where appropriate to facilitate understanding. FIG. 4 shows a vertical orientation of gas flow axially through a housing 60 having an inlet 62 for receiving gas-liquid stream 12, and an outlet 64 for discharging gas stream 26. Nozzle structure 66 in the housing has a plurality of nozzles or holes 68 receiving the gas-liquid stream from inlet 62 and accelerating the gas-liquid stream radially horizontally through nozzles 68 and radially through annular gap 70 to impinge annular inertial collector 72. Collector 72 is in the path of the accelerated gas-liquid stream and causes a sharp directional change thereof and has a rough porous collection surface 74, as above. The housing has a vertical axial flow path therethrough including a first flow path portion 76 for the gas-liquid stream between inlet 62 and gap 70, and a second flow path portion 78 for the gas stream between gap 70 and outlet 64. The flow path has a directional change 80 in gap 70 at collection surface 74, and a directional change 82 in flow path portion 76. Each of directional changes 82 and 80 is 90°. Pass-through filter 84 in flow path portion 78 in the housing provides a back-up safety filter trapping liquid particles re-entrained in the gas stream after separation at inertial collector 72. Filter 84 extends horizontally along a radial span relative to the noted vertical axial direction. The radial horizontal span of filter 84 extends across the entire housing and is perpendicular to collection surface 74. After the noted directional change 80, the gas stream flows axially along and parallel to collection surface 74 and then flows axially through pass-through filter 84 to outlet 64. Drain 86 in housing 60 drains separated fluid from collector 72 externally of the housing back to engine crankcase 16. Drain 86 is gravitationally below and on the opposite side collector 72 from pass-through filter 84.

Figure 5:
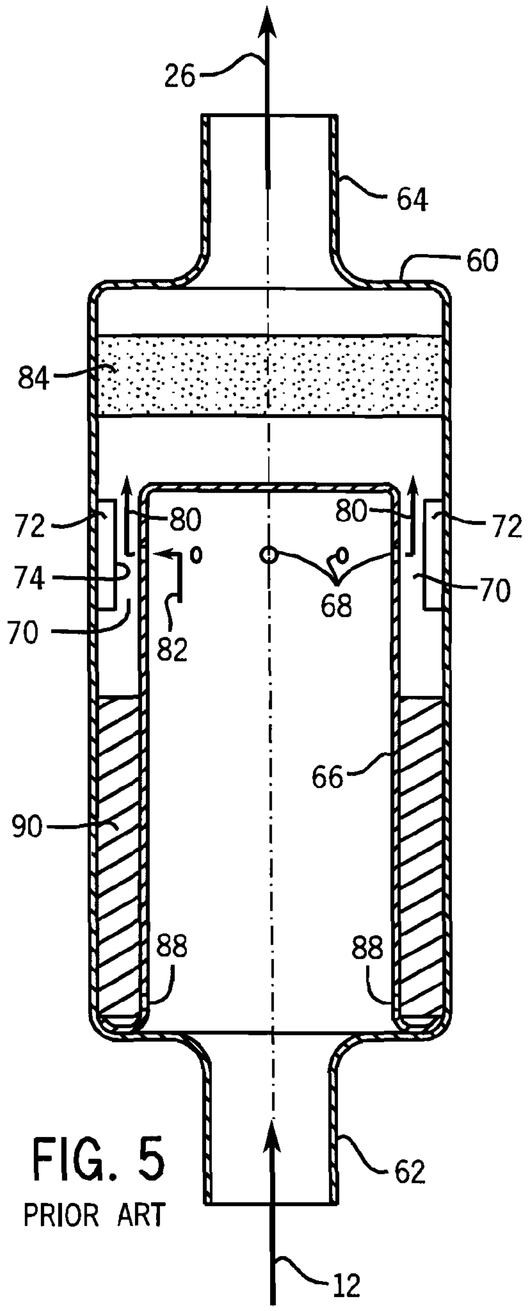

FIG. 5 is similar to FIG. 4 and uses like reference numerals where appropriate to facilitate understanding. In FIG. 5, drain 88 in the housing drains separated fluid from collector 72 to inlet 62. Drain 88 is gravitationally below and on the opposite side of collector 72 from pass-through filter 84. A second pass-through filter 90 in the housing is gravitationally below and on the opposite side of collector 72 from pass-through filter 84 and filters separated fluid from collector 72 drained through drain 88 to inlet 62. The drain is provided by a plurality of holes or ports 88 in nozzle structure 66.

Ports 88 in FIG. 5 are also bypass ports through which gas-liquid stream 12 may flow to gap 70 without being accelerated through nozzles 68. The gas-liquid stream from inlet 62 thus has a main flow path through nozzles 68 and accelerated through gap 70 against collector 72, and an alternate flow path through bypass ports 88 and filter 90 to gap 70. Pass-through filter 90 in the noted alternate flow path traps and coalesces liquid in the gas-liquid stream to remove liquid from the gas stream supplied to outlet 64. Outlet 64 thus receives a gas stream from the noted main flow path with liquid removed by collector 72, and receives a gas stream from the noted alternate flow path with liquid removed by pass-through filter 90. Inlet 62 is gravitationally below pass-through filter 90. Liquid removed by pass-through filter 90 from the gas-liquid stream in the noted alternate flow path thus drains through drain or bypass ports 88 to inlet 62.

Pass-through filter 90 also filters liquid removed from the gas-liquid stream in the noted main flow path by collector 72 and drains such liquid back through drain 88 to inlet 62.

FIG. 6 shows an inertial gas-liquid separator 92 for removing and coalescing liquid particles from a gas-liquid stream 94. Housing 92 has an inlet 96 for receiving gas-liquid stream 94, and an outlet 98 for discharging a gas stream 100. Nozzle structure 102 in the housing has a plurality of nozzles 104 receiving the gas-liquid stream from inlet 96 and accelerating the gas-liquid stream through the nozzles. An inertial collector 106 in the housing in the path of the accelerated gas-liquid stream causes a sharp directional change thereof as shown at 108. The collector has a rough porous collection surface 110 causing liquid particle separation from the gas-liquid stream. Drain 112 in the housing drains separated fluid from the collector back to crankcase 16.

Nozzles 104 in FIG. 6 have an upstream entrance opening 114, and a downstream exit opening 116. Entrance opening 114 is larger than exit opening 116. The nozzles have a frusto-conical tapered transition section 118 between the entrance and exit openings. The frusto-conical tapered transition section has an upstream end 120 of a first diameter at entrance opening 114, and has a downstream end 122 of a second diameter smaller than the noted first diameter. Downstream end 122 of frusto-conical tapered transition section 118 is spaced from exit opening 116 by a second transition section 124 of constant diameter equal to the noted second diameter.

In one embodiment, collection surface 34, FIGS. 1-3, 74, FIGS. 4 and 5, 110, FIG. 6, is a fibrous collection surface comprising a plurality of layers of fibers. At least two or three layers of fibers are desirable and provide improved performance. In the preferred embodiment, at least one hundred layers of fibers are provided. The fibers have a diameter at least three times the diameter of the liquid particles to be separated and captured. In preferred form, the fiber diameter is in the range of 50 to 500 microns. For oil mist droplets in the range from 0.3 microns to 3 microns, with a 1.7 micron average, particle separation efficiency improved to 85% mass efficiency with the noted fibrous collection surface, as comparing to 50% mass efficiency for a smooth non-porous collection surface.

In another embodiment, the collection surface is a porous collection surface of porosity between 50% and 99.9%. The average pore size is at least five to ten times the diameter of the liquid particles, and preferably at least 25 to 50 microns.

In another embodiment, the collection surface is a rough collection surface having a roughness measured in peak-to-valley height of at least ten times the diameter of the liquid particles. The peak to valley height is measured parallel to the direction of gas-liquid flow from the nozzles to the collection surface. The peak-to-valley height is preferably at least 10 microns.

Present Application

The present invention provides an inertial gas-liquid impactor separator, as above, for removing liquid particles from a gas-liquid stream 12, FIG. 1, 94, FIG. 6, for example oil particles from a blowby gas stream from crankcase 16 of internal combustion engine 14. In such embodiment, the separator returns separated oil 52 at drain 50, FIG. 1, 112, FIG. 6, back to crankcase 16, and returns separated air 26, FIG. 1, 100, FIG. 6, to air intake manifold 18 of the engine. In such applications, it is desired to vent blowby gas from crankcase 16 of engine 14. Untreated, these gases contain particulate matter in the form of oil mist and soot. It is desirable to control the concentration of the contaminants, especially if the blowby gases are to be recirculated back to the engine's air intake system, for example at air intake manifold 18. The oil mist droplets are generally less than 5 microns in diameter, and hence are difficult to remove using conventional fibrous filter media while at the same time maintaining low flow resistance as the media collects and becomes saturated with oil and contaminants. The separator may be used in closed crankcase ventilation (CCV) systems and in open crankcase ventilation (OCV) systems, including in diesel engine applications, as well as other inertial gas-liquid impactor separator applications.

The separator includes a housing such as 20, FIG. 1, 92, FIG. 6, having an inlet 22, 96, for receiving a gas-liquid stream 12, FIG. 1, 94, FIG. 6, and an outlet 24, 98 for discharging a gas stream 26, 100. One or more nozzle valves, to be described, are provided in the housing, replacing nozzles 30 of FIG. 1 and 104 of FIG. 6, and receiving the gas-liquid stream 12, 94, from the inlet 22, 96 and accelerating the gas-liquid stream through the one or more nozzle valves, as above. An inertial impactor collector such as 32, FIG. 1, 106, FIG. 6, is provided in the housing, as above, in the path of the accelerated gas-liquid stream and causes liquid particle separation from the gas-liquid stream, all as above. The inertial impactor collector may be provided with a rough porous collection or impingement surface, as above, or a smooth non-porous impactor impingement surface, or other inertial impactors as desired. The plural nozzles 30 of FIG. 1 and 104 of FIG. 6 are replaced with nozzle valves to now be described.

FIGS. 7-10 show a nozzle valve 150 for replacing nozzle 30, FIG. 1, or 104, FIG. 6, in the housing 20, 92, and receiving the gas-liquid stream 12, 94 from the inlet 22, 96 and accelerating the gas-liquid stream therethrough along an axial flow direction 152 from upstream to downstream. The inertial impactor collector 32, 106 in the housing is downstream of nozzle valve 150 in the path of the accelerated gas-liquid stream and causes liquid particle separation from the gas-liquid stream, as above. Nozzle valve 150 has an upstream entrance axial end 154 receiving gas-liquid stream 12, 94 from the inlet 22, 96, and a downstream exit axial end 156 discharging the gas-liquid stream against the inertial impactor collector 32, 106. Nozzle valve 150 has a sidewall 158 extending axially downstream from entrance axial end 154 to exit axial end 156 and guiding the gas-liquid stream therealong (upwardly in FIG. 7). Sidewall 158 and exit axial end 156 are radially constrictable and expansible to vary the flow to the inertial impactor collector 32, 106 thereabove.

Sidewall 158 is tapered along a taper which preferably narrows along a direction pointing in the same direction as the axial flow direction (upwardly in FIGS. 7, 9). Sidewall 158 is flexible and flexes between a constricted position, FIGS. 9, 10, and an expanded position, FIGS. 7, 8. The sidewall flexes such that the pressure drop dP across the valve is a nonquadratic function of flowrate therethrough, namely:

$$dP = C \times \text{flowrate}^n$$

where C is a constant, and n is less than 2, whereby pressure drop changes as a more linear function of flowrate as compared to a quadratic function. This is in contrast to the flow restriction of a fixed orifice which is a quadratic function of flowrate therethrough, i.e. pressure drop varies as the square of the flowrate, i.e. the second power of flowrate.

In one embodiment, sidewall 158, FIGS. 7-10, is provided by a plurality of overlapping fins 160 radially swingable inwardly, FIGS. 9, 10, in increasingly overlapping relation to define a narrowing orifice 162 therebetween, and radially swingable outwardly, FIGS. 7, 8, in decreasingly overlapping relation to define a widening orifice 164 therebetween. The fins have hinged upstream ends 166 defining entrance axial end 154 of nozzle valve 150, and have downstream ends 168 swingable in respective arcs about respective upstream ends 166 and defining the exit axial end 156 of nozzle valve 150. Fins 160 are biased, for example by tension springs such as 170, to a radially inwardly swung position, FIGS. 9, 10, and swing to a radially outwardly swung position, FIGS. 7, 8, against the bias of springs 170 in response to increasing pressure of gas-liquid stream 12, 94.

Nozzle valve 150 is responsive to pressure of the gas-liquid stream 12, 94. In inertial gas-liquid impactor separators it is desirable to maintain constant high flow velocity through the nozzle such as 30, 104, 150 without creating additional back pressure as flow increases, e.g. as an engine ages which in turn results in increased blowby gas flow. Ideally, the pressure drop vs. aging or flow slope should be zero for a given flow range, or at least flatter or more linear than a quadratic slope. Pressure drop varies as a square function of flow, i.e. to the second power. Liquid separation efficiency depends on flow velocity through the nozzle orifice and impaction velocity against impactor 32, 106. The variable nozzle orifice area provided by nozzle valve 150 enables desired higher flow and impaction velocity without deleteriously increased pressure drop, and enables a lower, flatter slope of pressure drop vs. aging or flow. Fins 160 of sidewall 158 are biased by springs 170 to a constricted position, FIGS. 9, 10. Increasing pressure of gas-liquid stream 12, 94 moves fins 160 of sidewall 158 radially outwardly, to increase effective flow area at 164 through the nozzle orifice, and to reduce back pressure. The pressure drop corresponding to increased flow follows a lower, flatter pressure drop slope, which lower pressure drop slope enables higher velocity at low flow, and lower pressure drop at higher flow, which in turn increases efficiency.

The system enables increased separation efficiency early in the life of the engine without suffering objectionably high pressure drop late in the life of the engine including end-of-life condition of the engine. As an engine wears, more blowby gas is created, and the inertial impactor 32, 106 sees a larger flow and increased pressure from the crankcase 16. When this happens, the separator actually begins to perform with higher efficiency, but also has a larger pressure drop. Standard impactor separators must be designed to meet this end-of-life condition in order to not produce too high of a pressure drop. This means the efficiency early in the life of the engine may not be optimized. Nozzle valve 150 provides a variable orifice area which increases in response to increasing pressure of the gas-liquid stream 12, 94. This enables advantages including increased separation efficiency early in the life of the engine without suffering objectionably high pressure drop late in the life of the engine including end-of-life condition of the engine.

FIGS. 11-13 show a further embodiment. One or more nozzle valves 180 replace nozzles 30, FIG. 1, 104, FIG. 6, in the housing 20, 92. Nozzle valve 180 receives the gas-liquid stream 12, 94 from the inlet 22, 96 and accelerates the gas-liquid stream therethrough along axial flow direction 182 from upstream to downstream. Inertial impactor collector 32, 106 in the housing is downstream of nozzle valve 180 in the path of the accelerated gas-liquid stream and causes liquid particle separation from the gas-liquid stream, as above. Nozzle valve 180 has an upstream entrance axial end 184 receiving the gas-liquid stream from the inlet 22, 96, a downstream exit axial end 186 discharging the gas-liquid stream against the inertial impactor collector 32, 106, and a sidewall 188 extending axially downstream from entrance axial end 184 to exit axial end 186 and guiding the gas-liquid stream therealong. Sidewall 188 and exit axial end 186 are radially constrictable and expansible to vary the flow to the inertial impactor collector 32, 106. In one embodiment, a valve plate 190 has a plurality of nozzle valves 180.

Sidewall 188 is tapered along a taper which narrows along a direction pointing in the same direction as axial flow direction 182. Sidewall 188 is flexible and flexes between constricted and expanded positions. The sidewall flexes in response to pressure of the gas-liquid stream 12, 94. The sidewall flexes such that the pressure drop dP across valve 180 is a nonquadratic function of flowrate therethrough, namely as in the equation noted above, whereby pressure drop changes as a more linear function of flowrate as compared to a quadratic function.

In the embodiment of FIGS. 11-13, sidewall 188 is fluted along axially extending flutes or folds 192, FIG. 13, defining a plurality of axial flow channels 194. In response to increasing pressure of gas-liquid stream 12, 94, sidewall 188 radially expands, and the flutes at least partially unfold, to increase flow area. Fluted sidewall 188 tapers along a taper which narrows along a direction pointing in the same direction as axial flow direction 182. In one preferred embodiment, the constituent material of sidewall 188 is malleable rubber. In one form, in the contracted condition of sidewall 188, flow channels 194 are in communication with each other and a central flow channel 196 therebetween. In another embodiment, FIGS. 14-16, sidewall 198 of nozzle valve 200 has a contracted condition, FIG. 16, with flow channels 202 closed off from each other by portions 204 of the sidewall therebetween and closed off from a central flow channel 206 defined by portions 204 of sidewall 198 therearound. In the embodiments of FIGS. 11-16, the sidewall 188, 198 is fluted about its entire perimeter. In another embodiment, FIGS. 17, 18, sidewall 210 of nozzle valve 212 is fluted about only a portion 214 of its perimeter, and is unfluted about the remainder 216 of its perimeter. FIG. 17 shows nozzle valve 212 in the radially inwardly constricted position. FIG. 18 shows nozzle valve 212 in the radially outwardly expanded position providing increased flow area in response to increasing pressure of gas-liquid stream 12, 94.

FIGS. 19-22 show a further embodiment. Nozzle valve 220 replaces nozzles 30, FIG. 1, and 104, FIG. 6, in the housing 20, 92 and receives the gas-liquid stream 12, 94 from the inlet 22, 96 and accelerates the gas-liquid stream therethrough along axial flow direction 222 from upstream to downstream. The inertial impactor collector 32, 106 in the housing is downstream of nozzle valve 220 in the path of the accelerated gas-liquid stream 12, 94 and causes liquid particle separation from the gas-liquid stream, as above. Nozzle valve 220 has an upstream entrance axial end 224 receiving gas-liquid stream 12, 94 from the inlet 22, 96, a downstream exit axial end 226 discharging the gas-liquid stream against the inertial impactor collector 32, 106, and a sidewall 228 extending axially downstream from entrance axial end 224 to exit axial end 226 and guiding the gas-liquid stream therealong. Sidewall 228 and exit axial end 226 are radially constrictable and expansible to vary the flow to the inertial impactor collector 32, 106.

Sidewall 228 is tapered along a taper which narrows along a direction pointing in the same direction as axial flow direction 222. Sidewall 228 is flexible and flexes between constricted and expanded positions. Sidewall 228 flexes in response to pressure of the gas-liquid stream 12, 94. Sidewall 228 flexes such that the pressure drop dP across nozzle valve 220 is a nonquadratic function of flowrate therethrough, as in the above noted equation, whereby pressure drop changes as a more linear function of flowrate as shown at 230 in FIG. 22, as compared to a quadratic function as shown at 232.

In the embodiment of FIGS. 19-22, nozzle valve 220 is a duckbill valve. The duckbill valve has downstream lips 234, 236, FIGS. 20, 21, forming exit axial end 226. Sidewall 228 has downstream sidewall portions meeting at lips 234, 236 at exit axial end 226 at an interface slit 238, FIG. 21, extending transversely to axial flow direction 222. The noted transverse direction is into and out of the page in FIG. 20, and is up-down in FIG. 21. The noted axial flow direction 222 is upwardly in FIG. 20, and out of the page in FIG. 21. FIG. 22 is a plot of flowrate vs. pressure drop and shows at 232 the conventional quadratic function of pressure drop vs. flowrate through a fixed orifice. The plot at 230 shows the more linear, flatter slope of pressure drop vs. flowrate after an initial cracking pressure 234 for a duckbill valve, as is known. Increasing flowrate along the horizontal axis occurs with increasing age of the engine, for example as piston rings wear, and blowby gas flow increases.

FIG. 23 shows a further embodiment. The nozzle valve provided by duckbill valve 220 may typically be constituted by elastomeric material which may have a stiffness sensitive to changing temperature, which thus affects flexing and opening of the valve with temperature. In FIG. 23, one or more strip springs such as 240 extend along at least one of and preferably both lips 234 and 236 and/or one or more strip springs such as 242 extend along sidewall 228. The structural properties of the strip springs are preferably less sensitive to variations in temperature than the material of the duckbill valve. Preferably the variation with temperature of the stiffness (modulus of elasticity) of the spring material is less than that of the duckbill valve material. For example, the strip springs may be metallic and be less subject to stiffness and flex change than the elastomeric material of the duckbill valve in response to changing temperature. The strip springs may be molded-in during molding of the duckbill valve, or may be bonded thereto after formation of the duckbill valve, or may be attached in any suitable manner. The one or more strip springs at 240 extend transversely of axial flow direction 222. The one or more strip springs at 242 extend along the axial flow direction. In one preferred embodiment, duckbill valve 220 has a cracking-pressure response wherein pressure drop across the duckbill valve must reach a predetermined threshold value before the duckbill valve opens. This provides improved separation efficiency at very low blowby flow conditions which may, for example, be encountered at idle with a non-worn engine.

FIGS. 24-33 show a further embodiment including a valve plate 250 having a plurality of nozzle valves such as 252, 254, etc. Nozzle valves 252, 254 replace nozzle valves 30, FIG. 1, and 104, FIG. 6, in the housing 20, 92 for receiving the gas-liquid stream 12, 94 from the inlet 22, 96, and accelerating the gas-liquid stream through the nozzle valves along axial flow direction 256, FIG. 27, from upstream to downstream. The inertial impactor collector 32, 106 in the housing is downstream of the nozzle valves 252, 254 in the path of the accelerated gas-liquid stream 12, 94 and causes liquid particle separation from the gas-liquid stream, as above. The nozzle valves have an upstream entrance axial end 258, FIG. 25, receiving the gas-liquid stream 12, 94 from the inlet 22, 96, a downstream exit axial end 260 discharging the gas-liquid stream 12, 94 against the inertial impactor collector 32, 106, and a sidewall 262 extending axially downstream from entrance axial end 258 to exit axial end 260 and guiding the gas-liquid stream therealong. Sidewall 262 and exit axial end 260 are radially constrictable, FIG. 25, and expansible, FIG. 27, to vary the flow to the inertial impactor collector 32, 106.

Sidewall 262 is tapered along a taper which narrows along a direction pointing in the same direction as axial flow direction 256. Sidewall 262 is flexible and flexes between a constricted position, FIG. 25, and an expanded position, FIG. 27. Sidewall 262 flexes in response to pressure of the gas-liquid stream 12, 94. Sidewall 262 flexes such that the pressure drop dP across nozzle valve 252 is a nonquadratic function of flowrate, as in the above noted equation, whereby pressure drop changes as a more linear function of flowrate as compared to a quadratic function, as noted above.

The plurality of nozzles valves 252, 254 in FIGS. 24-33 each have a sidewall such as 262 flexing between the noted constricted and expanded positions in response to pressure of the gas-liquid stream 12, 94 such that the nozzle valves flex from a closed condition, FIG. 25, to an open condition, FIG. 27, in response to increasing pressure of the gas-liquid stream. In one preferred embodiment, one of the nozzle valves such as 252 flexes to an open condition, FIG. 26, at a lower pressure of the gas-liquid stream than another of the nozzle valves such as 254, FIG. 26, to provide multi-stage opening of the nozzle valves in response to increasing pressure of the gas-liquid stream. At a first stage at a given lower pressure, a first set of nozzle valves such as 252 open, FIG. 26, while other nozzle valves such as 254 remain closed. At a second stage at a higher pressure, the noted other nozzle valves such as 254 also open, FIG. 28, in addition to the already open first set of nozzle valves 252. This provides staged sequentially opening nozzle valves. The opening pressure of a respective nozzle valve may be controlled according to at least one of the shape, geometry, and thickness of its respective sidewall 262. Alternatively, the constituent material of the nozzle valves may be varied.

Nozzle plate 250 has the noted plurality of nozzle valves such as 252, 254, etc. mounted thereto in parallel side-by-side relation and providing staged cumulatively increasing flow therethrough in response to increasing pressure of the gas-liquid stream 12, 94, all within a single nozzle plate 250. In one preferred embodiment, nozzle valves 252, 254, etc. are overmolded on nozzle plate 250, FIG. 29. The entrance axial end 258 of each of the nozzle valves is mounted to nozzle plate 250, and the respective sidewall 262 extends axially therefrom. In a further embodiment, nozzle plate 250 may have one or more permanently open orifices 264 passing the gas-liquid stream 12, 94 therethrough without a nozzle valve thereat. This provides an initial stage, FIGS. 30, 31, wherein all of the nozzle valves 252, 254 are closed, and the gas-liquid stream flows only through open orifices 264, followed by the next stage wherein nozzle valves 252 open, FIG. 26, followed by a yet further stage wherein nozzle valves 254 also open, FIGS. 28, 32, 33. The respective nozzles valves open at respective predetermined pressures of gas-liquid stream 12, 94. In a further embodiment, one or more or all of open orifices 264 are eliminated or are replaced by nozzle valves such as 252, 254, or the like.

The system provides changing nozzle area. When flow increases, nozzle area increases, and when flow decreases, nozzle area decreases. This enables consistent velocity and pressure drop across the nozzle for a large range of volumetric flowrates. As flowrate through an orifice increases, fluid velocity and pressure drop increase. Higher fluid velocity in an inertial impactor separator in a crankcase ventilation system increases efficiency of the separator, which is beneficial. However, higher pressure drop across the impactor separator nozzle increases crankcase pressure, which may strain engine seals, which is detrimental. With fixed geometry nozzles, low flowrates mean low fluid velocities and low efficiency (undesirable) and low pressure drop (desirable). High flowrates mean high velocities and high efficiency (desirable) and high pressure drop (undesirable). A system enabling adjustable nozzle area enables a large change in fluid flow with only slight changes in flow velocity and pressure drop. This in turn enables a higher low-flow efficiency, and a lower high-flow pressure drop, which are otherwise at cross-purposes and require a trade-off therebetween.

The system is desirably adaptable to and capable of accommodating different engine sizes in crankcase ventilation systems. When a customer wishes to purchase a CCV system, there are generally three options. The first option is to install a remote mount aftermarket impactor separator. A second options is to install a coalescer system, which may or may not have to be custom designed. A third option is to develop an impactor separator specifically for the particular engine. Installing a remote mount impactor separator is the easiest option, particularly if a diaphragm actuated variable impactor separator may be used which may accommodate a large number of engine sizes while maintaining consistent efficiency at different engine loads and horsepower. A desirable solution is provided by nozzle valves with sidewalls and exit axial ends radially constrictable and expansible to vary the flow to the inertial impactor collector.

Over the life of an engine, the flow entering the crankcase ventilation system increases. The impactor separator is typically designed to handle flow conditions towards the end of engine life. Thus, the separation efficiency of the impactor separator at the beginning of engine life is lower due to lower velocities through the nozzles. Adjusting the cross-sectional flow area as flow increases or decreases is desirable to allow the velocity to remain relatively constant, or at least follow a lower flatter slope 230, FIG. 22, in a plot of pressure drop vs. flowrate, which corresponds to engine aging. The flatter restriction or pressure drop vs. flow or aging curve provides a more constant resulting efficiency for the impactor separator. In the case of the noted rubber duckbill valve, the lips 234 and 236 of the valve are nearly closed initially, i.e. beyond the noted cracking pressure 234, and provide a high velocity jet at low flowrates, and then the lips gradually open as the flowrate increases, maintaining high velocity. The remaining embodiments preferably perform comparably by utilizing variable geometry nozzle valves. It is desirable to overcome fixed orifice crankcase ventilation impactor separators which provide separation performance that falls off rapidly with diminishing flowrate. This is because the orifi must be sized such that a given maximum pressure drop is not exceeded at a maximum flowrate condition. However, the impactor separator spends much of its operational life at lower flowrates, which in turn penalizes the separator with lower impaction velocity and lower efficiency and separation performance. This problem is overcome or at least reduced by the noted variable geometry nozzle valves including the noted radially constrictable and expansible nozzle sidewall and exit axial end to vary the flow to the inertial impactor collector. The noted variable geometries provide simple and effective solutions. For example, duckbill valves provide a particularly simple and low cost variable nozzle geometry that can maintain higher jet impaction velocity across a wide range of flowrates, and can therefore deliver better aerosol separation efficiency across a wider flow range without exceeding the maximum pressure drop constraint of the engine crankcase at maximum blowby flowrate. Multiple nozzle valves may be used in a parallel flow arrangement, with differing flow restriction characteristics provided by differing sizes, geometries, or material stiffnesses, to further tune the pressure drop vs. flowrate response of the system. In a duckbill valve implementation, if variation of the elastomeric valve stiffness with temperature causes excessive variation in the pressure drop flow restriction response of the valve, then it may be advantageous to attach (via bonding, overmolding, clipping, or the like) the noted strip springs 240, 242 (e.g. leaf springs, e.g. metallic or other material), onto the duckbill valve lips and/or sidewalls, axially or transversely, to provide reduced temperature sensitivity. In the case of a duckbill nozzle valve, an anti-whistling valve design may be used if desired, for example as shown in U.S. Pat. No. 5,301,707, incorporated herein by reference. This may address flutter under some flow conditions creating dynamic instability, sometimes called whistling.

In one embodiment, the system provides variable impactor technology compensating for increased crankcase ventilation blowby gas resulting from wear over the life of the engine by allowing the blowby gas stream to access additional nozzles in a sequentially staged manner. The system is particularly compact and enables variable nozzle orifice area without consuming additional space or volume in an engine compartment. The noted one-piece nozzle plate provides plural variable nozzles, reducing part content, space, and cost, while improving performance. The integrated one-piece design reduces the number of components and not only lowers cost but also enables a smaller packaging envelope. Each nozzle may be designed individually, e.g. to provide a variable array of nozzle valves in a confined space and opening at different flowrates. For example, FIGS. 24-33 illustrate a one-piece three-stage variable nozzle plate, wherein the nozzles may be composed of TPE or silicone. Each nozzle or group of nozzles can be designed such that at given pressures a staged or predetermined opening sequence pattern may be enabled. The pressure required to open a nozzle may be controlled by adjusting the shape and/or geometry and/or thickness and/or material of the respective nozzle. The design decreases the number of components and space required for a variable inertial gas-liquid separator while at the same time enabling increased performance by adding an increased number of variable stages which open during the life of the engine. For example, FIG. 24 shows an early life stage, where only the permanently open orifices 264 pass blowby gas therethrough to the inertial impactor collector 32, 106. FIG. 26 shows a mid-life stage, as volumetric blowby gas flowrate increases, and mid-life nozzles 252 open and pass blowby gas therethrough, in addition to the blowby gas flowing through permanently open orifices 264. FIG. 28 shows an end-of-life stage, as the volumetric flowrate of blowby gas increases, and the end-of-life nozzles 254 open and pass blowby gas therethrough, in addition to blowby gas flow through mid-life nozzles 252 and permanently open orifices 264.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An inertial air-oil separator for removing oil mist droplets in blowby gas from an internal combustion engine, comprising an inlet for receiving said blowby gas from the engine, and an outlet discharging separated air, an acceleration nozzle accelerating said blowby gas therethrough along an axial flow direction from upstream to downstream, an inertial impactor collector in said housing downstream of said acceleration nozzle in the path of said accelerated blowby gas and causing oil droplet separation from said blowby gas, said acceleration nozzle comprising an upstream entrance axial end receiving said blowby gas from said inlet, a downstream exit axial end discharging said blowby gas against said inertial impactor collector, and a flexible sidewall extending axially between said entrance axial end and said exit axial end and guiding said blowby gas therealong, said flexible sidewall flexing radially inwardly and outwardly to decreasingly and increasingly, respectively, vary the flow to said inertial impactor collector responsive to the pressure of said blowby gas from said engine and pressure drop across said acceleration nozzle, and providing increased separation efficiency early in the life of the engine without suffering objectionably high pressure drop late in the life of the engine including end-of-life condition of the engine, by said flexible sidewall flexing radially outwardly to increase acceleration nozzle orifice area in response to increasing blowby gas flow and pressure as the engine ages, wherein said flexible sidewall flexes such that pressure drop across said acceleration nozzle is a nonquadratic function of flowrate therethrough and such that pressure drop changes as a more linear function of said flowrate as compared to a quadratic function in a plot of pressure drop vs. flowrate, with increasing flowrate occurring with increasing age of the engine as piston rings wear and blowby gas flow increases, wherein the flexing of said flexible sidewall provides a more linear, flatter slope in said plot than a quadratic function.

2. An inertial air-oil separator for removing oil mist droplets in blowby gas from an internal combustion engine, comprising an inlet for receiving said blowby gas from the engine, and an outlet discharging separated air, a plurality of acceleration nozzles in said housing each receiving said blowby gas from said inlet and accelerating said blowby gas therethrough along a respective axial flow direction from upstream to downstream, one or more inertial impactor collectors in said housing downstream of a respective said acceleration nozzle in the path of the respective accelerated blowby gas and causing oil droplet separation from the blowby gas, each said acceleration nozzle comprising an upstream entrance axial end receiving said blowby gas from said inlet, a downstream exit axial end discharging said blowby gas against the respective said inertial impactor collector, and a flexible sidewall extending axially between the respective entrance axial end and the respective said exit axial end and guiding said blowby gas therealong, wherein said sidewall of one of said acceleration nozzles flexes radially outwardly to increase blowby gas flow through said one acceleration nozzle at a lower pressure of said blowby gas than said sidewall of another of said acceleration nozzles, to provide multi-stage flexing of sidewalls of different acceleration nozzles at different pressures of said blowby gas, and staged cumulatively increasing flow through said acceleration nozzles in response to increasing pressure of said blowby gas as the engine ages, and to tune pressure drop vs. flowrate response.

* * * * *